United States Patent [19]

Plentovich et al.

[11] 3,887,695

[45] *June 3, 1975

[54] PRODUCTION OF SODIUM HYDROSULFITE FROM FORMATES

[75] Inventors: Jack Plentovich, Nansemond County; Charles Ellis Winslow, Jr., Norfolk; Mearl A. Kise, Portsmouth, all of Va.

[73] Assignee: Virginia Chemicals Inc., Portsmouth, Va.

[ * ] Notice: The portion of the term of this patent subsequent to Apr. 27, 1988, has been disclaimed.

[22] Filed: Nov. 16, 1970

[21] Appl. No.: 89,720

Related U.S. Application Data

[63] Continuation-in-part of Ser. No. 9,078, Feb. 5, 1970, Pat. No. 3,576,598.

[52] U.S. Cl. .............................................. 423/515
[51] Int. Cl............................................ C01b 17/98
[58] Field of Search...................... 23/116; 423/515

[56] References Cited

UNITED STATES PATENTS

| | | | |
|---|---|---|---|
| 3,411,875 | 11/1968 | Yoshikaww et al.................. | 23/116 |
| 3,576,598 | 4/1971 | Plentovich et al.................. | 23/116 |

FOREIGN PATENTS OR APPLICATIONS

| | | | |
|---|---|---|---|
| 1,148,248 | 4/1969 | United Kingdom.................. | 23/116 |

Primary Examiner—Earl C. Thomas
Attorney, Agent, or Firm—David H. Semmes

[57] ABSTRACT

Method for the production of anhydrous sodium hydrosulfite ($Na_2S_2O_4$) by feeding together solutions of sulfur dioxide ($SO_2$) and methyl alcohol ($CH_3OH$) and sodium hydroxide (NaOH), sodium formate (HCOONa) and water into a reactor containing a water-miscible alcohol; stirring and heating under pressure, while venting carbon dioxide ($CO_2$); cooling and recovering by filtering hydrosulfite solids.

6 Claims, 2 Drawing Figures

$SO_2 + NaOH + HCOONa \quad Na_2S_2O_4 + CO_2 + H_2O$

PRODUCTION OF SODIUM HYDROSULFITE FROM FORMATES

CROSS-REFERENCES TO RELATED APPLICATIONS

A continuation-in-part of PRODUCTION OF SODIUM HYDROSULFITE FROM FORMATES (Ser. No. 9,078), filed Feb. 5, 1970, now U.S. Pat. No. 3,576,598. The present application differs from the parent application in that the methyl formate recovered with methyl alcohol, as the anhydrous sodium hydrosulfite product is removed, is re-cycled as part of the reactant feed solution.

BACKGROUND OF THE INVENTION

1. Field of the Invention

A great deal of recent attention has been given to the production of anhydrous alkaline metal hydrosulfites, using formates. This attention is due to the contemporary by-product availability of the formates. Earlier inventors have addressed themselves to laboratory production of hydrosulfites from formates; however, these earlier methods did not address themselves to the criticality of commercial yield nor the adaptability of the laboratory process for commercial use. For the most part, the earlier inventors batch-reacted the alkaline metal hydroxides, and gaseous sulfur dioxide with the formates, achieving somewhat less than optimum yield. According to the present method, there is obtained from cheaper raw materials a high yield of hydrosulfite of high purity and great stability.

2. Description of the Prior Art

Great Britain Pat. No. 11,010 Kinzlberger, (corresponding to U.S. Pat. No. 1,166,160 and Germany Pat. No. 343,791) featured the production of anhydrous hydrosulfite by reacting formic acid or formates with sulfurous acid or salts, while excluding the presence of water. In one example, sodium formate and formic acid are mixed in alcohol to which is added sodium pyrosulfite, while heating and stirring. In another example, sodium formate and formic acid are mixed in alcohol to which is added sodium pyrosulfite, while heating, then passing a current of sulfur dioxide into the mixture.

Great Britain Pat. No. 11,906 Casella teaches the production of sodium hydrosulfite by mixing formaldehyde, sodium sulphoxylate, sodium bisulphite and common salt in solution, while heating.

Great Britain Pat. No. 25,872 Kinzlberger is an improvement upon Great Britain Pat. No. 11,010 teaching the production of anhydrous hydrosulphites by dissolving formic acid in alcohol, while heating and adding sulfurous acid. The hydrosulfite is recovered by filtering.

U.S. Pat. No. 1,036,705 (Portheim, apparently a Kinzlberger employee) teaches reacting a bi-sulfite solution with formic acid in the absence of water, so as to obtain the anhydrous hydrosulfites. Either ammonium or potassium may be employed.

U.S. Pat. No. 2,010,615 (Victor Chemical) is an improvement over earlier Kinzlberger patents, both U.S. and foreign, for producing anhydrous sodium hydrosulfite from sodium formate and sulfur dioxide. Alkali metal sulfites are reacted with alkali formates and sulfur dioxide in a solution of either ethyl or methyl alcohol and water. U.S. Pat. No. 2,010,615 distinguishes from the prior art in the use of larger quantities of water in the reaction. Experiments performed according to the process described in U.S. Pat. No. 2,010,615 yielded sodium hydrosulfite with a maximum purity of 85% and yields of 50 to 60% based on sulfur dioxide and 30 to 35% based on sodium formate. The dried product appeared to be more dusty and less stable. Since only low reactant concentrations can be employed, a maximum of only 125 gm/l of product is obtained, and the reaction time is approximately eight hours.

Belgian Pat. No. 698,427 (Mitsubishi Edogawa) is a further improvement on U.S. Pat. No. 2,010,615. According to this patent the three raw materials, sodium formate, sodium hydroxide, and sulfur dioxide are maintained in three separate solutions or suspension; the formate in an alcohol-water suspension in the reactor, the sodium hydroxide as an aqueous solution, and the sulfur dioxide as an alcohol solution. The three are brought together for batch reaction by simultaneously feeding the latter two into the first. Experiments performed according to the process described in this patent yielded sodium hydrosulfite with a maximum purity of 91% and yields of 60 to 65% based on sulfur dioxide and 40 to 45% based on sodium formate. The maximum production was 150 gm/l, and the reaction required a minimum of three and one-half hours.

Yoshikawa U.S. Pat. No. (3,411,875) related to Belgium Pat. No. (698,427), has been issued to the assignee Mitsubishi Edogawa and concerns the production of HYDROSULFITES FROM FORMATES.

As in Belgium Pat. No. 698,427, Yoshikawa U.S. Pat. No. (3,411,875) is a batch reaction process wherein sulfur dioxide containing methanol and an alkaline agent are batch-reacted with an aqueous solution of alkali metal formates. In U.S. Pat. 3,411,875 dependent claim 2 the alkaline agent is defined as sodium hydroxide and the alkaline metal formate is designated as sodium formate.

However, according to the present invention, sulfur dioxide-methanol is not added to the total aqueous alkali metal formate solution within the reactor, as disclosed in U.S. Pat. No. (3,411,875). Rather, applicants have found that better efficiencies and substantially greater productivity per unit volume of the reaction system and per unit of the solvent alcohol can be achieved by separately dissolving the sodium hydroxide and sodium formate reactant, prior to simultaneous feeding with the methanolic $SO_2$.

SUMMARY OF THE INVENTION

The present method is an improvement over U.S. Pat. No. 2,010,615; Belgium Pat. No. 698,427; and U.S. Pat. No. 3,411,875. According to the present invention, sulfur dioxide ($SO_2$) is absorbed in methyl alcohol ($CH_3OH$) as a first feed solution; sodium hydroxide and sodium formate are completely dissolved in water by heating, as a second feed solution, and a small amount of methyl alcohol is fed, as a third feed solution. The third feed solution is fed into the reactor while stirring and heating under pressure, then the first and second solutions are simultaneously fed together, while continuing stirring and heating within the reactor under pressure. $CO_2$ is vented, the reaction contents are cooled, and the hydrosulfite yield is filtered out and dried. By using higher temperatures and pressures in the reaction process, applicants are able to use high reactant concentrations. As a result, there is a high production per unit of reactor volume, per unit of alcohol volume, and per unit of time. The over-all result is a significant improvement in the reactant to product yields.

By this process, sodium hydrosulfite of a high degree of purity may be produced, with yields in excess of 67% based on formate, in excess of 80% based on sulfur dioxide, and in excess of 74% based on sodium hydroxide. The high purity product has a large crystal size of good appearance, is devoid of dust, and is quite stable and readily soluble.

DESCRIPTION OF THE PREFERRED EMBODIMENTS

Figure 1:
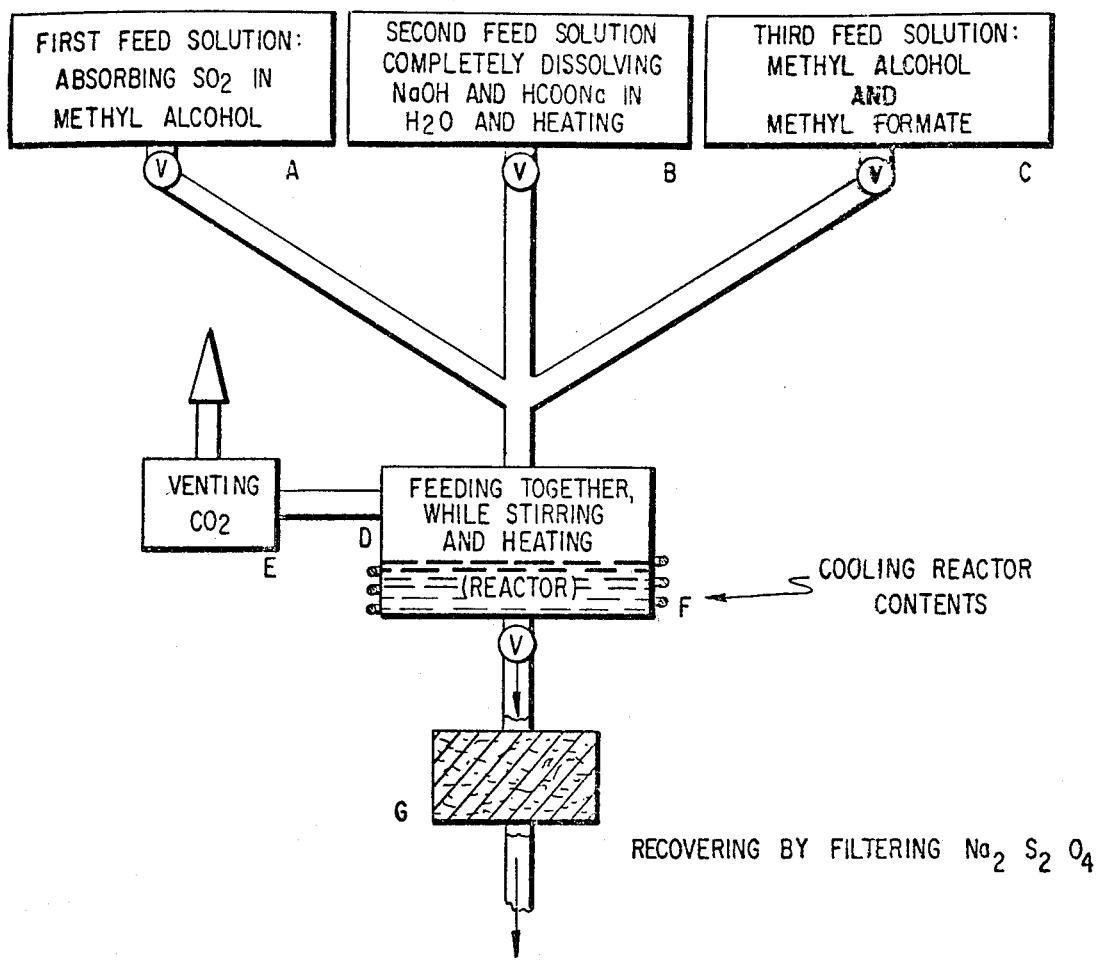
FIG. 1 is a flow sheet depicting applicant's method of producing sodium hydrosulfite.
Figure 2:
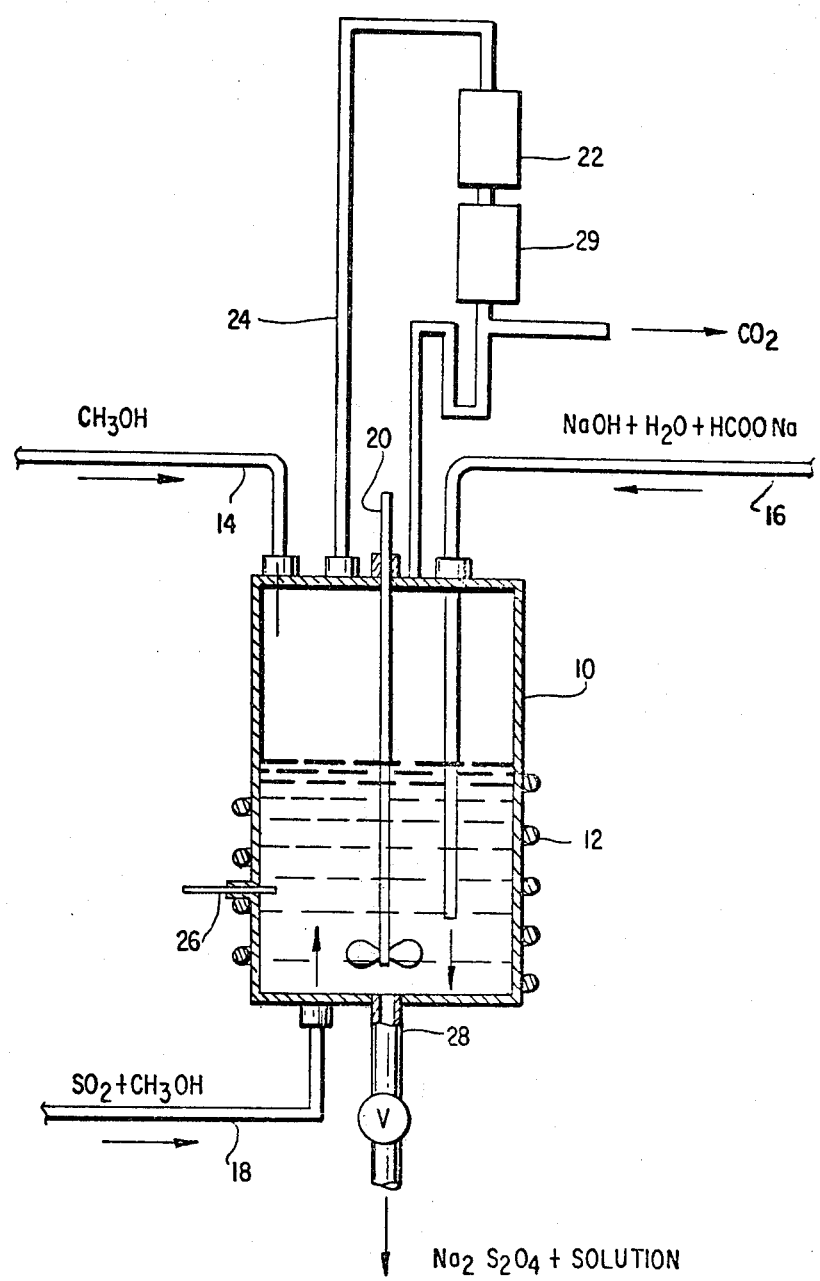
FIG. 2 is a schematic view of a proposed reactor, used according to present method.

A proposed reactor which may be used, according to the present method, is illustrated in FIG. 2. Reactor 10 is illustrated as having exterior cooling coils 12, stirrer 20 extending axially into the reactant mix and feeding solution input conduits 14, 16, and 18. A thermometer probe 26 may be employed to maintain heating at the desired optimum. $CO_2$ is vented via conduit 24 into reflux condensers 22 and 29 which are sufficient to strip all the methyl formate from the effluent carbon dioxide.

Upon completion of the reaction, the mix is discharged through conduit 28 to a filter system (not illustrated) for recovery of the hydrosulfite solids.

The sulfur dioxide-methyl alcohol feeding conduit 18 is a bottom feeding conduit, so as to prevent undesired heating of the inlet solution. Pre-heating of the inlet solution as occurs in a dip tube feeding device has the deleterious result of evolving sulfur dioxide gas, leading to process difficulties.

The following in an actual production example:

EXAMPLE I — Two feed solutions were prepared. A first feed solution was two by absorbing 1920 parts of sulfur dioxide in 2700 parts of methyl alcohol. A second feed solution was made by adding 550 parts of sodium hydroxide and 1360 parts of sodium formate to 880 parts of water and heating the resulting slurry to approximately 160°C. to effect complete solution of all solids. These solutions were fed to a stirred reactor equipped with a heating and/or cooling coil, a water cooled reflux condenser, a refrigerated brine cooled reflux condenser, and a thermometer. Initially, 1100 parts of methyl alcohol as a third feed solution was added to the reactor and heated with agitation to a temperature of 83°C. at a pressure of 25 pounds per square inch gauge. Feed of the sodium hydroxide-sodium formate second feed solution was initiated and maintained at a rate such that it was completely fed to the reactor in 60 minutes. Six minutes after commencing this feed, a flow of the methyl alcohol-sulfur dioxide solution was initiated and maintained at a rate such that 74 percent of this solution was fed to the reactor in 54 minutes. The mixture in the reactor resulting from the simultaneous addition of the first and second solutions was agitated all the while and the temperature maintained at 83°C. The pressure of the system was maintained at 25 pounds per square inch gauge. The pressure was controlled by the appropriate venting of the carbon dioxide gas formed in the reaction. At the end of this primary feed period, the flow rate of the methyl alcohol-sulfur dioxide first feed solution was adjusted so that the remaining 26 percent was fed in an additional 104 minute period, again maintaining the agitation, the temperature of 83°C. and the pressure of 25 psig. Continuing these conditions after the conclusion of all feeding of reactants for an additional 76 minute period resulted in completion of the desired reaction.

At this point the reactor contents were cooled to 70°C. and the anhydrous sodium hydrosulfite produced was separated from the solution by filtration. The solids were rinsed with 1200 parts methyl alcohol and dried by heating to 70°C. under vacuum. The resulting dry product, 2269 parts by weight, assayed 92.0 percent anhydrous sodium hydrosulfite, and was of large crystal size containing no obnoxious dust and of excellent stability, ready solubility, and good appearance.

In that a portion of the sodium formate fed to the reactor will be converted to methyl formate via a side reaction, the filtrate resulting from the removal of the anhydrous sodium hydrosulfite from the slurry will contain methyl formate in addition to methyl alcohol. When the methyl alcohol is recovered via distillation from the filtrate it will unavoidably contain all of the methyl formate originally contained in the filtrate. It has been found that this methyl formate can be effectively utilized as a raw material for the reaction in place of sodium formate, provided that an additional mole of sodium hydroxide be fed to the reactor for each mole of methyl formate added and each mole of sodium formate subtracted. A portion of the methyl formate and additional sodium hydroxide react in situ to achieve the same sodium formate — methyl formate equilibrium which exists in the absence of methyl formate in the feed.

The following is an actual example of this mode of operation utilizing recovered methyl alcohol containing methyl formate:

EXAMPLE II — two feed solutions were prepared. A first feed solution was obtained by absorbing 1920 parts of sulfur dioxide in 2700 parts of methyl alcohol. A second feed solution was made by adding 650 parts of sodium hydroxide and 1190 parts of sodium formate to 880 parts of water and heating the resulting slurry to approximately 160°C. to effect complete solution of all solids. These solutions were fed to a reactor exactly as described in Example I and in the same exact manner, and again maintaining the same pressures and temperatures as in Example I. Initially, however, 1100 parts of methyl alcohol containing 150 parts of methyl formate as a third feed solution was added to the reactor.

At the completion of the desired reaction the reactor contents were cooled, filtered, rinsed, and dried as in Example I. The resulting dry product, 2265 parts by weight, assayed 92.0% anhydrous sodium hydrosulfite and was of a quality equal to that of Example I.

COMPARISON OF APPLICANT'S PROCESS WITH U.S. PAT. NO. 3,411,875

In that both the U.S. Pat. No. 3,411,875 and the Virginia Chemical's application, (Ser. No. 9,078) involve the same raw materials, any comparison designed to show the advantages of one process relative to the other involves essentially two criteria; yield efficiencies in producing the desired end product from each of the raw materials, the production efficiency in rate of output of the desired end product per unit of reactor volume and per unit of time. The first of these two criteria relates only to the cost of raw materials needed to make the product, while the second relates to the operating cost and the cost of the plant required to make a given quantity of product. Note that in either process a necessary part of the operating cost is that of the recovery for reuse of the considerable quantity of methyl alcohol involved in the reaction. A quantitative comparison follows:

|  | U.S. 3,411,875 | Applicant |
|---|---|---|
| % yield based on sodium formate | 49.1 | 67.7 |
| % yield based on sulfur dioxide | 69.4 | 80.3 |
| % yield based on sodium hydroxide | 72.3 | 74.6 |
| Pounds of production per gallon of reactor volume per hour | 0.195 | 0.650 |
| Pounds of production per gallon of alcohol used | 1.83 | 4.50 |

The yield for each of the raw materials is considerably enhanced for the applicant's process as compared to that of U.S. Pat. No. 3,411,875. The improvement is such that raw material costs for the former would be 82% of those for the latter. The improvement in production rate is even more dramatic. Applicant's process will yield over three times the hourly production for a given reactor size than that of the U.S. Pat. No. 3,411,875 process. The saving in the cost of a plant is obvious. Further, the applicant's process yields over twice the production per gallon of alcohol as does the U.S. Pat. No. 3,411,875. Here again, a saving in plant cost results since the alcohol recovery facilities can be much more modest. Also, a reduction in operating cost is achieved because of the lesser quantity of alcohol to be recovered.

In order to achieve the very high production rate per unit of reactor volume reported in applicant's process example, it is essential to use very high concentrations of raw materials. In order that these high starting concentrations result in an acceptable efficiency in converting raw materials to product, it is absolutely essential that the sodium hydroxide and sodium formate be completely dissolved prior to reacting with the sulfur dioxide. They can be dissolved in the limited quantity of water permissible in the reaction only by heating to quite high temperatures, as 160°C. in the example. This can only be done outside the reactor, in that the permissible reaction temperature range is 60° to 90°C. Thus, in the U.S. Pat. No. 3,411,875 process, whereby all of the sodium formate is placed in the reactor initially, it is completely impossible to dissolve high concentrations of sodium formate prior to reaction with sulfur dioxide.

As should be obvious to one versed in the art, it is also possible to dissolve the two components, sodium hydroxide and sodium formate, individually, making two separate solutions rather than the one mixed solution. Again, the same limitation on the allowable quantity of water applies, and substantially elevated temperatures are still required. The two seaprate solutions should be fed to the reactor substantially simultaneously to achieve essentially the same effect as feeding a single mixed solution.

It would appear that the presence of a maximum quantity of dissolved sodium formate in the reactor is essential for successful operation at high reactant concentrations. The dissolved sodium formate apparently serves as an acidity buffer by suppressing the ionization of the formic acid formed by the reaction between sodium formate and sulfur dioxide (sulfurous acid). Thus, the hydrogen ion concentration is maintained at a low level, minimizing the decomposition of already formed sodium hydrosulfite. These conditions can be obtained only by feeding sodium formate to the reactor in a dissolved state. As previously noted, this completely dissolved condition of the sodium formate, along with the sodium hydroxide, can be achieved only by heating the mixture of the two or the two individually with the allowable quantity of water to a temperature very much in excess of that permitted in the reactor itself. It is obvious that this condition cannot be achieved in the U.S. Pat. No. 3,411,875 process.

The preferred reaction temperature range is 60° to 90° C. Below 60°C. the desired reaction forming sodium hydrosulfite does not occur, while above 90° C. the decomposition of the sodium hydrosulfite already formed becomes so rapid as to detract substantially from the yield. The selection of a single operating temperature within this range is a compromise between increasing speed of reaction with increasing temperature, on the one hand, and increasing decomposition losses with increasing temperature, on the other.

The pressure at which the reactor is operated must be at least sufficient to allow the selected reaction temperature to be achieved. The atmospheric boiling temperature of the mixture within the reactor is approximately 70° C., so that, if the selected reaction temperature is in the range of 60° to 70° C., operation may be had at atmospheric pressure. A superatmospheric pressure is mandatory to achieve reaction temperatures in the range of 70° to 90° C. However, a superatmospheric pressure in the reactor is to be preferred in that higher pressures aid in retaining, in the reactor, the highly volatile methyl formate formed via a side reaction. Such retention suppresses further side reaction forming still more methyl formate. No upper limit on the superatmospheric pressure exists other than the economical limit of reactor cost. The preferred operating pressure range is 10 to 50 psig.

Manifestly, the control temperatures, pressures, and times permitted for reaction may be varied extensively without departing from the spirit of the invention.

We claim:

1. Method of preparing sodium hydrosulfite ($Na_2S_2O_4$) from formates comprising:
   A. absorbing sulfur dioxide ($SO_2$) in methyl alcohol ($CH_3OH$) as a first feed solution;
   B. dissolving sodium hydroxide (NaOH) and sodium formate (HCOONa) in water ($H_2O$) and heating to effect complete solution of all solids, as a second feed solution;
   C. feeding a small amount of methyl alcohol ($CH_3OH$) and methyl formate ($HCOOCH_3$) to a reactor, as a third feed solution, while heating in the range 60° to 90° C. and stirring under superatmospheric pressure within said reactor;
   D. sequentially feeding together under pressure said first and second feed solutions as a reaction liquid into said reactor while stirring and heating in the range 60° to 90° C. under a superatmospheric pressure;
   E. venting carbon dioxide ($CO_2$) from said reaction liquid within said reactor;

F. cooling said reactor and contents;

G. recovering by filtering sodium hydrosulfite ($Na_2S_2O_4$) solids from said reaction liquid; and H. recovering methyl formate ($HCOOCH_3$) together with methyl alcohol ($CH_3OH$), sequentially of filtering said hydrosulfite from said reaction liquid, and recycling both said methyl formate ($HCOOCH_3$) and said methyl alcohol ($CH_3OH$) into said third feed solution.

2. Method of preparing sodium hydrosulfite ($Na_2S_2O_4$) from formates as in claim 1, including varying amounts of sodium hydroxide (NaOH) and sodium formate (HCOONa) dissolved in said second feed solution proportionately to the amount of methyl formate ($HCOOCH_3$) in said third feed solution.

3. Method of preparing sodium hydrosulfite ($Na_2S_2O_4$) from formates as in claim 1, including increasing the amount of sodium hydroxide (NaOH) while decreasing the amount of sodium formate (HCOONa) in said second feed solution proportionately to the amount of methyl formate ($HCOOCH_3$) in said third feed solution.

4. Method of preparing sodium hydrosulfite ($Na_2S_2O_4$) from formates as in claim 3, wherein one additional mole of sodium hydroxide (NaOH) is added and one mole of sodium formate (HCOONa) is subtracted for each mole of methyl formate ($HCOOCH_3$) in the third feed solution.

5. Method of preparing sodium hydrosulfite ($Na_2S_2O_4$) from formates comprising:

A. absorbing 1920 parts of sulfur dioxide ($SO_2$) in 2700 parts of methyl alcohol ($CH_3OH$) as a first feed solution;

B. dissolving 650 parts of sodium hydroxide (NaOH) and 1190 parts of sodium formate (HCOONa) in 880 parts of hot water ($H_2O$) as a second feed solution;

C. heating said second feed solution to approximately 160° C. so as to effect complete solution of all solids;

D. feeding 1100 parts of methyl alcohol ($CH_3OH$) and 150 parts of methyl formate ($HCOOCH_3$) to a reactor as a third feed solution, while heating in the range 60° to 90° C. and stirring under a superatmospheric pressure in the range of 10 to 50 psig within said reactor;

E. sequentially feeding together under pressure said first and second solutions as a reaction liquid into said reactor while stirring and heating in the range 60° to 90° C. under a superatmospheric pressure in the range of 10 to 50 psig;

F. venting carbon dioxide ($CO_2$) from said reaction liquid within said reactor;

G. cooling said reactor and contents; and

H. recovering by filtering sodium hydrosulfite ($Na_2S_2O_4$) solids from said reaction liquid.

6. Method of preparing sodium hydrosulfite ($Na_2S_2O_4$) from formates as in claim 1, wherein said sodium hydroxide (NaOH) and sodium formate (HCOONa) are dissolved individually prior to feeding into said reactor.

* * * * *